(12) United States Patent
Kurosaki et al.

(10) Patent No.: US 10,711,855 B2
(45) Date of Patent: Jul. 14, 2020

(54) CONTROL DEVICE FOR SELECTABLE ONE-WAY CLUTCH

(71) Applicant: TOYOTA JIDOSHA KABUSHIKI KAISHA, Toyota-shi, Aichi-ken (JP)

(72) Inventors: Yuki Kurosaki, Yamato (JP); Hiroyuki Ogawa, Susono (JP); Hiroyuki Shibata, Odawara (JP); Kenji Itagaki, Sunto-gun (JP); Koichi Kato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 16/190,942

(22) Filed: Nov. 14, 2018

(65) Prior Publication Data

US 2019/0170199 A1 Jun. 6, 2019

(30) Foreign Application Priority Data

Dec. 1, 2017 (JP) .................................. 2017-232131

(51) Int. Cl.
*F16D 48/10* (2006.01)
*F16D 41/12* (2006.01)
*F16D 48/06* (2006.01)
*F16D 41/08* (2006.01)

(52) U.S. Cl.
CPC ........... *F16D 48/10* (2013.01); *F16D 41/084* (2013.01); *F16D 41/12* (2013.01); *F16D 48/06* (2013.01); *F16D 2500/10493* (2013.01)

(58) Field of Classification Search
None
See application file for complete search history.

(56) References Cited

U.S. PATENT DOCUMENTS

| | | | | |
|---|---|---|---|---|
| 6,517,464 | B2* | 2/2003 | Yamazaki | B60K 6/36 477/5 |
| 6,722,456 | B2* | 4/2004 | Hisada | B60K 6/445 180/65.235 |
| 6,849,027 | B2* | 2/2005 | Eich | B60W 10/02 477/174 |
| 8,267,231 | B2 | 9/2012 | Holmes | |
| 9,623,868 | B2* | 4/2017 | Hirasawa | B60W 20/50 |

(Continued)

FOREIGN PATENT DOCUMENTS

JP 2015-202788 A 11/2015
JP 2015-203456 A 11/2015

*Primary Examiner* — Dirk Wright
(74) *Attorney, Agent, or Firm* — Oliff PLC (57) ABSTRACT

A control device for a selectable one-way clutch includes a pocket plate; a notch plate rotating relative to the pocket plate; a selector plate between the pocket plate and the notch plate rotating coaxially with the notch plate to change between a state allowing engagement members to pass through respective openings and to stand up from a side close to the pocket plate toward a side close to the notch plate and a state allowing the housing recesses to house the engagement members; and a motion detection unit detecting a motion of the selector plate. Further, when an unintended motion of the selector plate is detected, the pocket plate and the notch plate to rotate differentially at a rotation speed equal to or less than a predetermined absolute value, and the selectable one-way clutch to fall into a state of ratchet or into a state of overrun.

5 Claims, 9 Drawing Sheets

(56) References Cited

U.S. PATENT DOCUMENTS

| | | | | |
|---|---|---|---|---|
| 9,771,067 B2* | 9/2017 | Hokoi | ................... | B60W 20/20 |
| 10,272,898 B2* | 4/2019 | Itagaki | ................... | B60W 10/02 |
| 10,308,241 B2* | 6/2019 | Itagaki | ................... | B60K 6/445 |
| 10,358,123 B2* | 7/2019 | Lee | ................... | B60W 10/023 |
| 10,400,879 B2* | 9/2019 | Cashatt | ................... | F16H 39/42 |
| 2020/0116215 A1* | 4/2020 | Satoh | ................... | F16H 61/662 |
| 2020/0116257 A1* | 4/2020 | Ayabe | ................... | F16D 41/04 |

* cited by examiner

CONTROL DEVICE FOR SELECTABLE ONE-WAY CLUTCH

CROSS-REFERENCE TO RELATED APPLICATION(S)

The present application claims priority to and incorporates by reference the entire contents of Japanese Patent Application No. 2017-232131 filed in Japan on Dec. 1, 2017.

BACKGROUND

The present disclosure relates to a control device for a selectable one-way clutch.

Japanese Laid-open Patent Publication No. 2015-202788 discloses a control device that controls a selectable one-way clutch provided with struts, which are engagement members. At the time of failure when a sensor detects an unintended motion of a selector plate, the control device performs control in the following manner to prevent erroneous engagement of the selectable one-way clutch. That is, at a low vehicle speed, the control device controls the selectable one-way clutch to rotate at a rotation speed which enables upkeep of a state of ratchet in which a pocket plate and a notch plate differentially rotate in a positive direction so that the struts do not engage with engagement recesses in the notch plate. At a high vehicle speed, the control device controls the selectable one-way clutch to rotate at a rotation speed which enables upkeep of a state of overrun in which the pocket plate and the notch plate differentially rotate in a negative direction so that the struts and the engagement recesses do not engage with each other. In addition, at low vehicle speed and when a remaining amount of charge is large, the control device controls the selectable one-way clutch to rotate at a rotation speed which enables upkeep of the state of overrun.

However, when the selectable one-way clutch is kept rotating differentially at a high rotation speed while being in the state of overrun or in the state of ratchet, such differential rotation continuously makes a large impact on the struts, which may cause abnormalities in the struts.

SUMMARY

There is a need for a selectable one-way clutch that prevents abnormalities in engagement members at the time of failure.

According to an embodiment, a control device for a selectable one-way clutch includes a pocket plate including a plurality of housing recesses on one surface thereof; engagement members housed in the respective housing recesses; elastic members being disposed between bottoms of the respective housing recesses and the engagement members and biasing the engagement members; a notch plate rotating relative to the pocket plate and including a plurality of engagement recesses on a surface that faces the one surface of the pocket plate; and a selector plate disposed between the pocket plate and the notch plate, having a plurality of openings that penetrates the selector plate in a thickness direction, and rotating coaxially with a rotation axis of the notch plate to change over between a first state and a second state, the first state allowing the engagement members to pass through the respective openings and to stand up from a side close to the pocket plate toward a side close to the notch plate, the second state allowing the housing recesses to house the respective engagement members. Further, the control device for the selectable one-way clutch includes a motion detection unit detecting a motion of the selector plate, and when the motion detection unit detects an unintended motion of the selector plate, the control device causes the pocket plate and the notch plate to rotate differentially at a rotation speed equal to or less than a predetermined absolute value, and the control device controls the selectable one-way clutch to fall into a state of ratchet where the engagement members and the engagement recesses do not engage with each other by differential rotation of the pocket plate and the notch plate in a positive direction, or into a state of overrun where the engagement members and the engagement recesses do not engage with each other by differential rotation of the pocket plate and the notch plate in a negative direction.

Further, in the above, when the motion detection unit detects an unintended motion of the selector plate, the control device may control a rotation speed of the selectable one-way clutch to be equal to or more than a minimum rotation speed that ensures an infinite service lifetime or a semi-infinite service lifetime even with the selectable one-way clutch being kept in the state of overrun, the rotation speed being equal to or less than zero.

DETAILED DESCRIPTION

An embodiment of a control device for a selectable one-way clutch according to the present disclosure will be described. Noted that the present disclosure is not limited to this embodiment.

Figure 1:
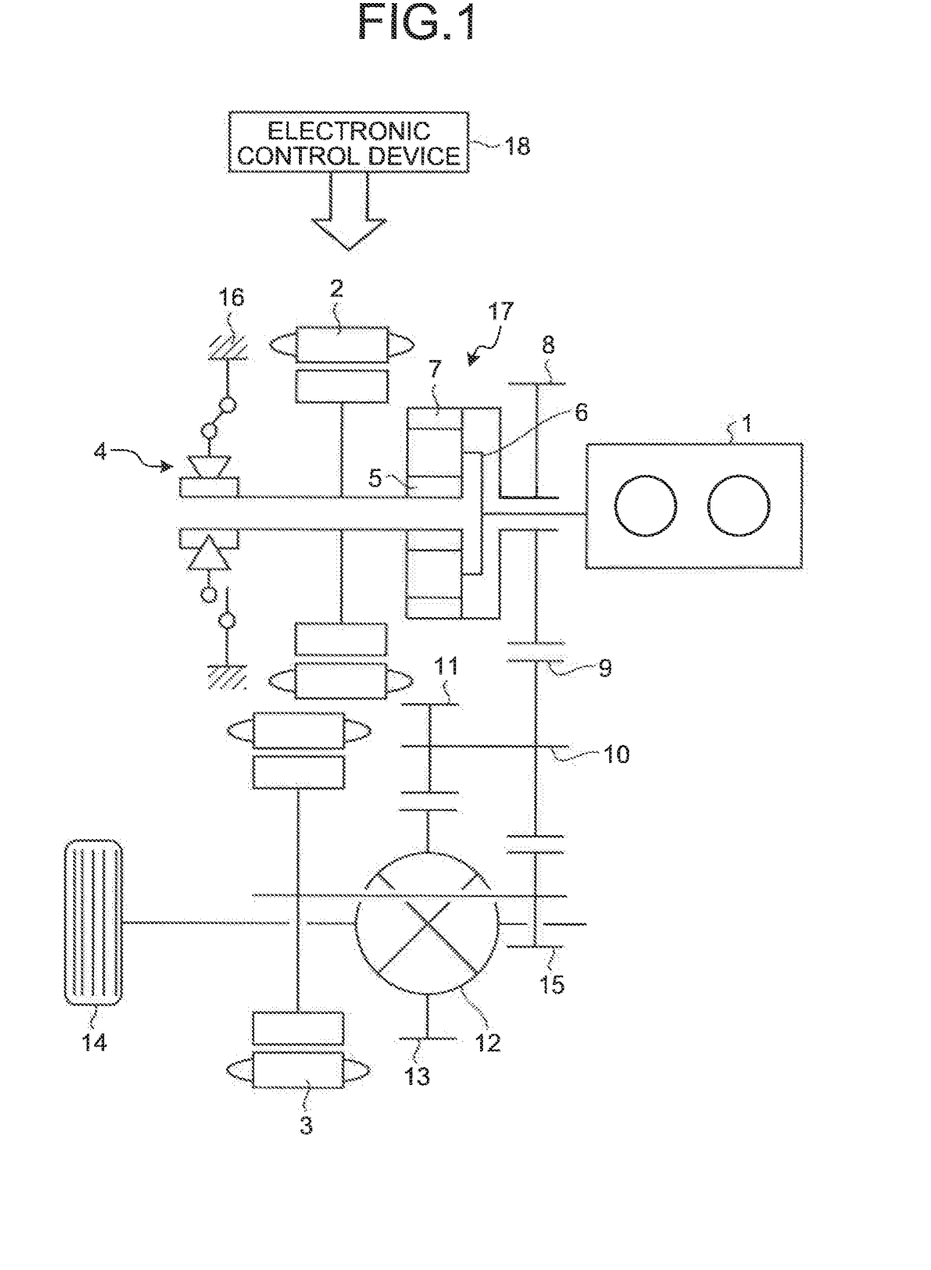
FIG. 1 is a skeleton diagram illustrating an example of a power transmission mechanism of a vehicle according to an embodiment.

FIG. 1 is a skeleton diagram illustrating an example of a power transmission mechanism of a vehicle according to an embodiment. The power transmission mechanism of the vehicle illustrated in FIG. 1 includes an engine 1, a first motor generator 2, and a second motor generator 3 as drive sources. The first motor generator 2 mainly controls a rotation speed of the engine 1 and cranks the engine 1. The second motor generator 3 mainly functions as a drive source for running the vehicle. The first motor generator 2 is coupled, together with the engine 1, to a power split mechanism 17 that includes a differential mechanism. The first motor generator 2 adds or reduces torque in the second motor generator 3 to or from torque output from the power split mechanism 17.

In the example illustrated in FIG. 1, the power split mechanism 17 is provided with a single pinion planetary gear mechanism including, as rotary elements, a sun gear 5, a carrier 6, and a ring gear 7. A rotor of the first motor generator 2 is connected to the sun gear 5, an output shaft of the engine 1 is connected to the carrier 6, and the ring gear 7 functions as an output element. To the ring gear 7, an output gear 8 as an output member is attached. The output gear 8 meshes with a counter driven gear 9. To the counter driven gear 9, a counter shaft 10 is attached, and to the counter shaft 10, a counter drive gear 11 is attached. The counter drive gear 11 has a diameter smaller than that of the counter driven gear 9, and the counter drive gear 11 meshes with a ring gear 13 in a differential 12. From this differential 12, a drive torque is output toward a right-and-left drive wheel 14. The second motor generator 3 includes a rotor shaft to which a drive gear 15 is attached. The drive gear 15 meshes with the counter driven gear 9. The drive gear 15 has a diameter smaller than that of the counter driven gear 9, and the drive gear 15 and the counter driven gear 9 are included in a speed reduction mechanism.

The sun gear 5 to which the first motor generator 2 is connected is provided with a Selectable One-Way Clutch (hereinafter referred to as "SOWC") 4 between a casing 16. In a state of disengagement, the SOWC 4 enables relative rotation in both directions (i.e., positive and negative directions) so as not to transmit torque. In a state of engagement, the SOWC 4 restricts relative rotation in one direction (i.e., positive or negative direction) so as to transmit the torque in the direction, and allows relative rotation in the opposite direction so as not to transmit the torque in the opposite direction. Herein, the rotation in the positive direction indicates rotation in the same direction as a rotation direction of the engine 1, and the rotation in the negative direction indicates rotation in the direction opposite to the rotation direction of the engine 1.

The first motor generator 2 and the second motor generator 3 are connected to a controller unit such as a battery and an inverter (not illustrated) and are electrically connected to each other so as to mutually transmit and receive electric power. To control the battery and the controller unit or the SOWC 4 and the like, an electronic control device 18 is provided. The electronic control device 18 includes a microcomputer as a main component to which detection signals are input as data. The examples of the detection signals include vehicle speeds, accelerator positions, rotation speeds and estimated output torque of the engine, rotation speeds and torque of each of the motor generators 2 and 3, and operating states of the SOWC 4. The electronic control device 18 computes based on the input data and outputs command signals for controlling the motor generators 2, 3 and the SOWC 4 or the like.

Figure 2:
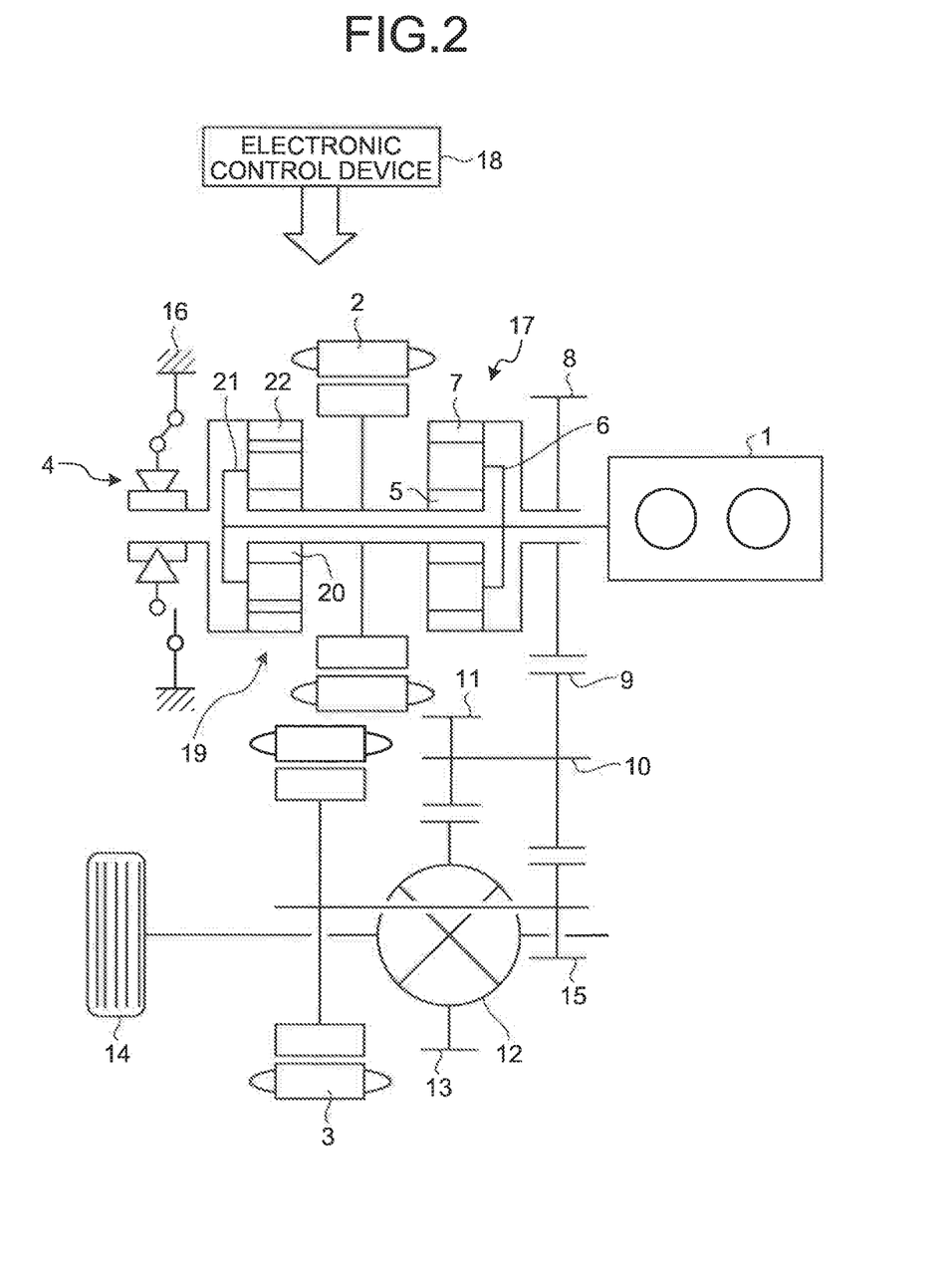
FIG. 2 is a skeleton diagram illustrating another example of the power transmission mechanism of a vehicle according to an embodiment.

FIG. 2 is a skeleton diagram illustrating another example of the power transmission mechanism of the vehicle according to an embodiment. In this power transmission mechanism, an overdrive mechanism 19 is additionally provided in the configuration of FIG. 1. The overdrive mechanism 19 is selectively locked by the SOWC 4.

The overdrive mechanism 19 is provided with a double pinion planetary gear mechanism including, as rotary elements, a sun gear 20, a carrier 21, and a ring gear 22. To the carrier 21, the carrier 6 in the power split mechanism 17 is connected, and the output torque in the engine 1 is transmitted to these carriers 6 and 21. To the sun gear 20, the sun gear 5 in the power split mechanism 17 is connected, and the torque in the first motor generator 2 is transmitted to these sun gears 5 and 20. Furthermore, the SOWC 4 is disposed between the ring gear 22 and the casing 16. The SOWC 4 restricts the ring gear 22 from rotating in the positive direction and falls into a state of overdrive. Each of the single pinion planetary gear mechanism included in the power split mechanism 17 and the double pinion planetary gear mechanism included in the overdrive mechanism 19 has the rotary elements connected in the above manner. Accordingly, those planetary gear mechanisms form what is called a compound planetary gear mechanism with four elements. In regard to other configurations, the power transmission mechanism illustrated in FIG. 2 is similar to the power transmission mechanism illustrated in FIG. 1. Therefore, other configurations in FIG. 2 are denoted by the same reference numerals as in FIG. 1 and will not be described herein.

Figure 3:
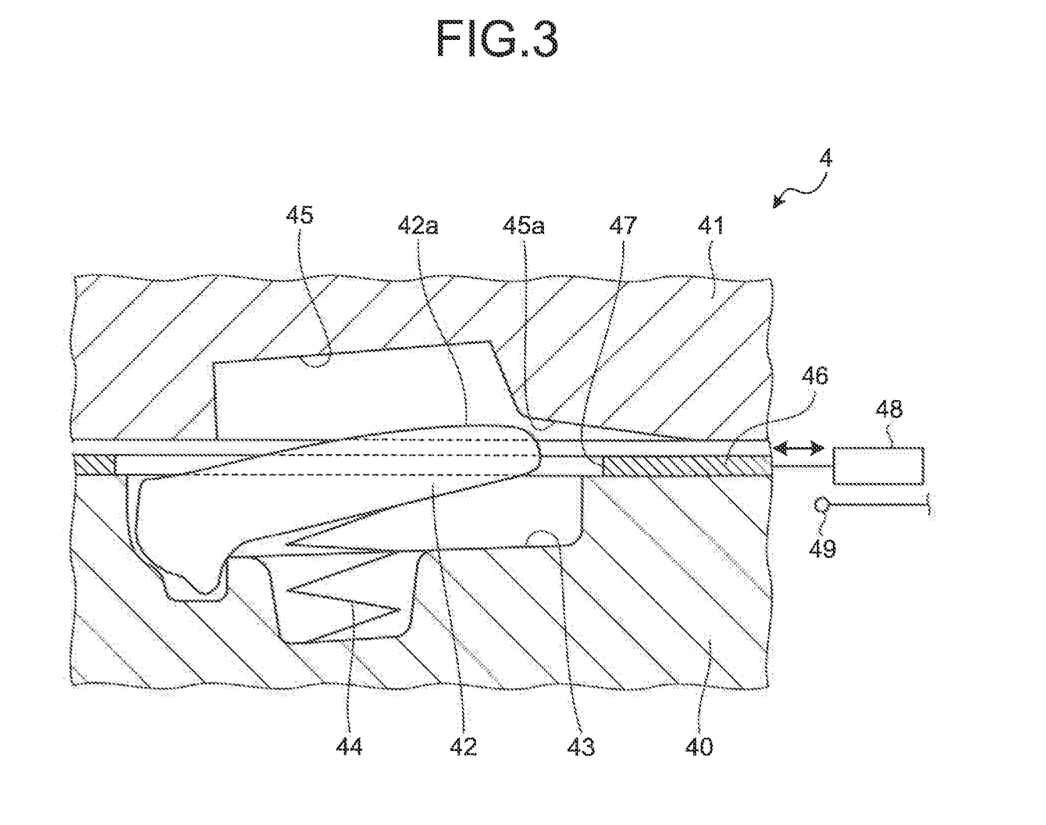
FIG. 3 is a partial cross-sectional view of a Selectable One-Way Clutch (SOWC) according to an embodiment.

FIG. 3 is a partial cross-sectional view of the SOWC 4 according to an embodiment. In the SOWC 4 according to this embodiment, a pocket plate 40 and a notch plate 41 are disposed coaxially, facing each other and being rotatable relative to each other. In the pocket plate 40, a plurality of pockets 43 or housing recesses is formed side by side in a circumferential direction. The plurality of pockets 43 houses respective struts 42 or engagement members. Each strut 42 is swingable about a base end thereof and is changeable between a state where the strut 42 is housed inside the pocket 43 and a state where a leading end of the strut 42 protrudes toward the notch plate 41. A spring 44 is disposed in each strut 42 on the side closer to the pocket plate 40, so that the leading end of the strut 42 is pushed toward the notch plate 41 by an elastic force of the spring 44. On the other hand, when the strut 42 is pushed with a strong force against the elastic force of the spring 44, the strut 42 is pushed back toward the inside of the pocket 43.

On a surface that faces the pocket plate 40, the notch plate 41 is provided with notches 45 corresponding to the struts 42. Each notch 45 is a rectangular engagement recess that allows the leading end of each strut 42 to enter therein and allows the strut 42 to engage with the notch 45. A plurality of notches 45 is arranged side by side in the circumferential direction at positions facing the struts 42. When torque in a direction, in which the leading end of each strut 42 comes into contact with an inner wall surface of each notch 45, acts between the pocket plate 40 and the notch plate 41, the pocket plate 40 and the notch plate 41 are connected by the struts 42 and are restricted from rotating relatively (rotating differentially). In other words, the clutch is in the state of engagement. When the torque acts in the opposite direction, a surface of each strut 42 that faces the notch plate 41 is pushed by the notch plate 41 or an open end of each notch 45. Therefore, the struts 42 are pushed back toward the pocket plate 40, and the struts 42 come out of the notches 45. In other words, the connection between the pocket plate 40 and the notch plate 41 through the struts 42 is disengaged, which enables the relative rotation between the pocket plate 40 and the notch plate 41.

Between the pocket plate 40 and the notch plate 41, a selector plate 46 is disposed, being rotatable relative to the pocket plate 40 and the notch plate 41. The selector plate 46, a member including an annular thin plate, is provided with a plurality of openings 47 that penetrates the selector plate 46 in a thickness direction. The plurality of openings 47 is disposed at positions corresponding to the struts 42 and the notches 45 at predetermined intervals in the circumferential direction. The openings 47 are formed in a shape that allows the struts 42 to pass therethrough and to protrude toward the notch plate 41.

The selector plate 46 moves between a state where the openings 47 coincide with the positions of the struts 42 and a state where the openings 47 are shifted from the positions of the struts 42 to push the struts 42 inside the pockets 43. To allow the selector plate 46 to change over between these two states, there is provided an actuator 48 that moves the selector plate 46. Furthermore, there is provided a sensor 49 or a motion detection unit that detects a stroke of the actuator 48 or a position of the selector plate 46.

In the SOWC 4, when the pocket plate 40 and the notch plate 41 relatively rotate in the negative direction, even when the struts 42 protrude toward the notch plate 41, a ratchet action is produced so that the struts 42 are pushed back by the notch plate 41. Due to such a ratchet action, the SOWC 4 functions as a one-way clutch. In the SOWC 4, the ratchet action may be generated even when the pocket plate 40 and the notch plate 41 relatively rotate in what is called the positive direction.

The leading end of each strut 42 has an arcuate surface 42a. In regard to a corner of each notch 45 that faces the arcuate surface 42a when the pocket plate 40 and the notch plate 41 rotate relative to each other in the positive direction, the corner is chamfered into a projecting curved surface to form a projecting arcuate surface 45a. When a relative rotation speed in the positive direction between the pocket plate 40 and the notch plate 41 is equal to or more than a predetermined value, the leading end of each strut 42 does not enter each notch 45, and the arcuate surface 42a and the projecting arcuate surface 45a abut against each other, which makes the strut 42 bounce back. In other words, the ratchet action is produced, and the SOWC 4 is kept in the state of disengagement.

In this embodiment, by utilizing the ratchet action in the rotation between the pocket plate 40 and the notch plate 41 in the negative direction or the ratchet action in the rotation in the positive direction, the electronic control device 18 controls the SOWC 4 so that the vehicle runs continuously while the SOWC 4 is kept in the state of disengagement with the struts 42 not being brought into the state of engagement at an abnormal time.

First Embodiment

Figure 4:
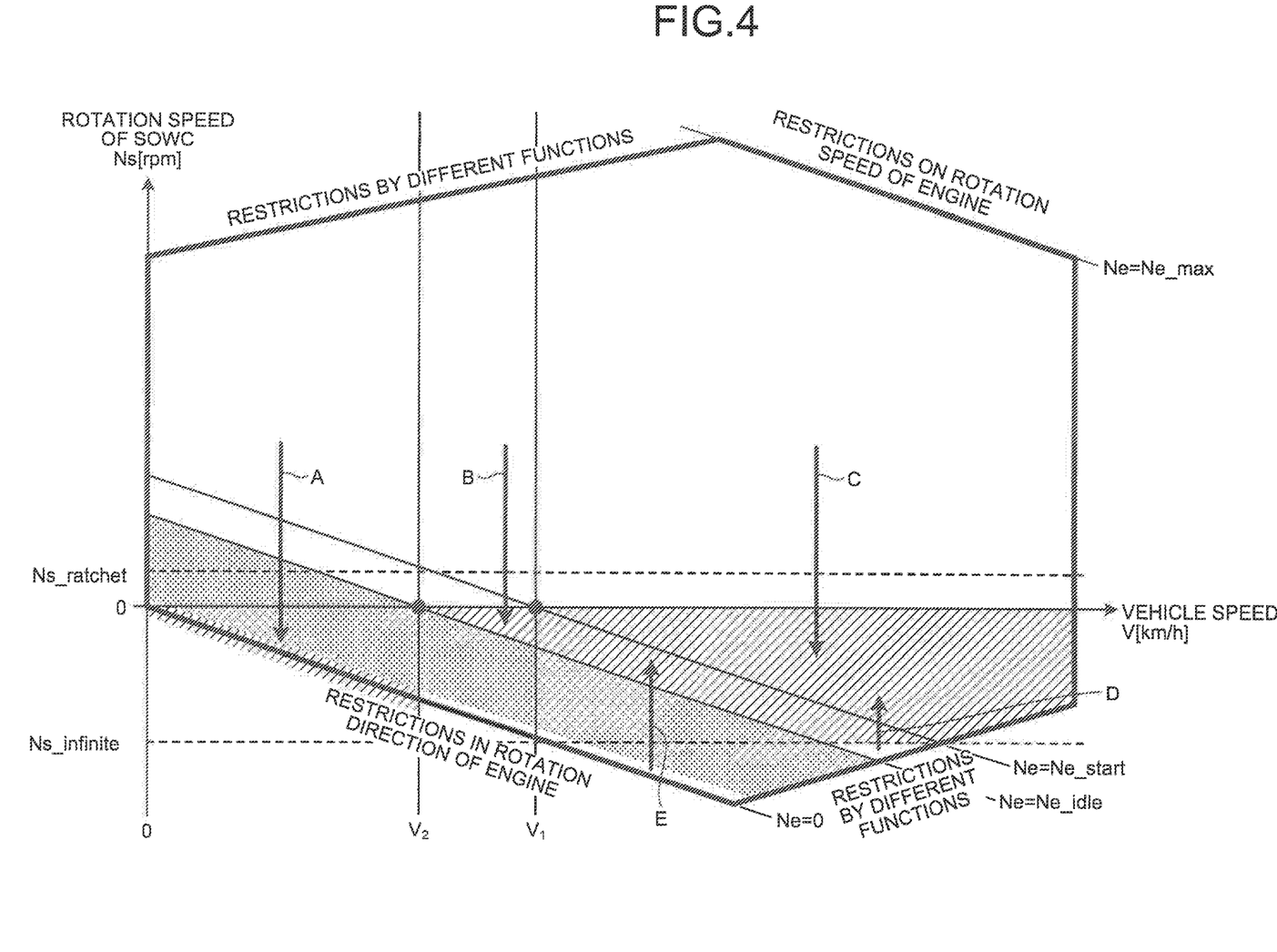
FIG. 4 is a graph illustrating a relationship between a vehicle speed and a rotation speed of the SOWC in a first embodiment.

FIG. 4 is a graph illustrating a relationship between a vehicle speed V and a rotation speed Ns of the SOWC 4 in a first embodiment. In FIG. 4, Ne represents a rotation speed of the engine 1, Ne_idle represents an idling engine speed of the engine 1, Ne_start represents a maximum rotation speed of the engine 1 at the engine start-up, and Ne_max represents a maximum rotation speed of the engine 1. In FIG. 4, Ns represents a rotation speed of the SOWC 4, Ns_ratchet represents a minimum rotation speed of the SOWC 4 at which the SOWC 4 is able to avoid engagement even when the SOWC 4 is kept in the state of ratchet, and Ns_infinite represents a minimum rotation speed of the SOWC 4 that ensures an infinite service lifetime in which the struts 42 do not break down for an infinite period or ensures a semi-infinite service lifetime in which the struts 42 do not break down within the service lifetime of a vehicle even when the SOWC 4 is kept in the state of overrun. In FIG. 4, $V_1$ represents a vehicle speed when the rotation speed Ns of the SOWC 4 is 0 rpm and when the rotation speed Ne of the engine 1 is equal to the maximum rotation speed Ne_start at the time of engine start-up. The symbol $V_2$ represents a vehicle speed when the rotation speed Ns of the SOWC 4 is 0 rpm and when the rotation speed Ne of the engine 1 is equal to the idling engine speed Ne_idle. The phrase "restrictions by different functions" described in FIG. 4 represents restrictions by each element, other than the engine 1 and the SOWC 4, included in the power transmission mechanism, for example, the planetary gear mechanism. In FIG. 4, a range in the rotation speed Ne of the engine 1 from 0 rpm to the idling engine speed Ne_idle represents a range where the rotation speed Ne of the engine 1 temporarily passes and does not stay at the time of engine start-up and engine shut-down.

Figure 5:
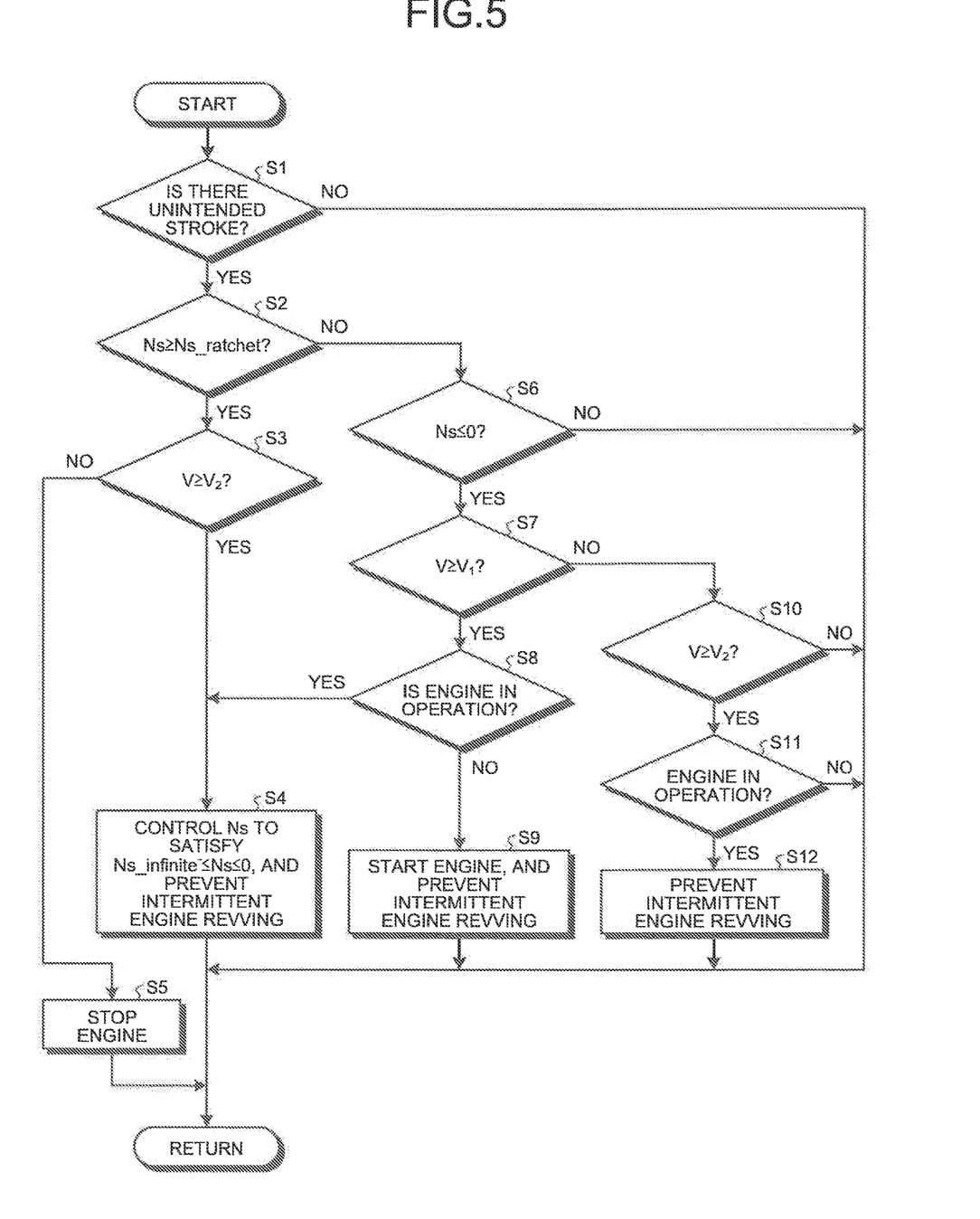
FIG. 5 is a flowchart illustrating failure control in the first embodiment which is performed based on the relationship between the vehicle speed and the rotation speed of the SOWC illustrated in FIG. 4.

FIG. 5 is a flowchart illustrating failure control in the first embodiment which is performed based on the relationship between the vehicle speed V and the rotation speed Ns of the SOWC 4 illustrated in FIG. 4. A routine of the failure control illustrated in FIG. 5 is repeatedly performed at every predetermined short time while the vehicle is running.

First, while the vehicle is running with the SOWC 4 in the state of disengagement, the electronic control device 18 determines whether the sensor 49 detects an unintended stroke of the actuator 48 due to an unintended motion of the selector plate 46 (step S1). An example of the unintended (unexpected) motion of the selector plate 46 includes a rotation of the selector plate 46 in a direction in which the SOWC 4 changes from the state of disengagement to the state of engagement along with the selector plate 46 being dragged by highly viscous lubricant oil, and an example of the unintended stroke of the actuator 48 includes a stroke of the actuator 48 at that time, but those unintended motion and stroke are not limited thereto. Determining that an unintended stroke is not detected (No in step S1), the electronic control device 18 returns to the starting point without performing any specific control so as to keep the SOWC 4 in the state of disengagement. On the other hand, determining that an unintended stroke is detected (Yes in step S1), the electronic control device 18 determines whether the rotation speed Ns of the SOWC 4 satisfies an inequality Ns≥Ns_ratchet (step S2).

Determining that Ns≥Ns_ratchet is satisfied (Yes in step S2), the SOWC 4 is in the state of ratchet at high speed by differential rotation in the positive direction, that is, the rotation in the same direction as the rotation direction of the engine 1 (rotation in a direction in which the rotation speed Ns of the SOWC 4 becomes positive), and the electronic control device 18 determines whether the vehicle speed V satisfies an inequality V≥$V_2$ (step S3). Determining that the inequality V≥$V_2$ is not satisfied (No in step S3), the electronic control device 18 stops the engine 1 (step S5), sets the rotation speed Ne of the engine 1 to 0 rpm (the arrow A in the FIG. 4), and causes the SOWC 4 to fall into the state of overrun at low speed by differential rotation in the negative direction, that is, rotation in the opposite direction to the rotation direction of the engine 1 (rotation in a direction in which the rotation speed Ns of the SOWC 4 becomes negative), and then, the electronic control device 18 returns to the previous process. At this time, the vehicle runs in the derate mode with the drive force from the second motor generator 3. On the other hand, determining that the inequality V≥$V_2$ is satisfied (Yes in step S3), the electronic control device 18 controls the rotation speed Ns of the SOWC 4 to satisfy an inequality Ns_infinite⁻≤Ns≤0 (the arrows B and C in FIG. 4), stops the SOWC 4 or causes the SOWC 4 to fall into the state of overrun at low speed by differential rotation in the negative direction, prevents intermittent engine revving (step S4), and returns to the previous process.

Determining in step S2 that the inequality Ns≥Ns_ratchet is not satisfied (No in step S2), the electronic control device 18 determines whether the rotation speed Ns of the SOWC 4 satisfies an inequality Ns≤0 (step S6). Determining that the equality Ns≤0 is not satisfied (No in step S6), the electronic control device 18 returns to the previous process without performing specific control. On the other hand, determining that the inequality Ns≤0 is satisfied (Yes in step S6), the electronic control device 18 determines whether the vehicle speed V satisfies an inequality V≥$V_1$ (step S7).

Determining that the inequality V≥$V_1$ is satisfied (Yes in step S7), the electronic control device 18 determines whether the engine 1 is in operation (step S8). Determining that the engine 1 is in operation (Yes in step S8), the electronic control device 18 controls the rotation speed Ns of the SOWC 4 to satisfy the inequality Ns_infinite⁻≤Ns≤0 (the arrow D in FIG. 4), causes the SOWC 4 to fall into the state of overrun at low speed by differential rotation in the negative direction, prevents intermittent engine revving (step S4), and returns to the previous process. On the other hand, determining that the engine 1 is not in operation (No in step S8), the electronic control device 18 starts the engine 1 (the arrow E in FIG. 4), causes the SOWC 4 to fall into the state of overrun at low speed by differential rotation in the negative direction, prevents intermittent engine revving (step S9), and returns to the previous process.

Determining in step S7 that the inequality V≥$V_1$ is not satisfied (No in step S7), the electronic control device 18 determines whether the vehicle speed V of the SOWC 4 satisfies an inequality V≥$V_2$ (step S10). Determining that the inequality V≥$V_2$ is not satisfied (No in step S10), the rotation speed Ne of the engine 1 is 0 rpm, and the SOWC 4 is in the state of overrun at low speed by differential rotation in the negative direction. Therefore, the electronic control device 18 returns to the previous process without performing specific control. On the other hand, determining that the inequality V≥$V_2$ is satisfied (Yes in step S10), the electronic control device 18 determines whether the engine 1 is in operation (step S11). Determining that the engine 1 is not in operation (No in step S11), the electronic control device 18 returns to the previous process without performing specific control. At this time, the vehicle runs in the derate mode with the drive force from the second motor generator 3. On the other hand, in step S11, determining that the engine 1 is in operation (Yes in step S11), the SOWC 4 is in the state of overrun at low speed by differential rotation in the negative direction. Therefore, the electronic control device 18 prevents intermittent engine revving (step S12) and returns to the previous process.

In the first embodiment, when an unintended motion of the selector plate 46 is detected, the electronic control device 18 controls the rotation speed Ns of the SOWC 4 so that the pocket plate 40 and the notch plate 41 rotate differentially at a rotation speed equal to or less than a predetermined absolute value, for example, Ns_infinite⁻≤Ns≤0. Accordingly, it is possible to avoid continuation of the state of ratchet at high speed and the state of overrun at high speed in the SOWC 4 at the time of failure. This leads to prevention of abnormalities in the struts 42 due to continuous and major impacts on the struts 42 at the time of failure.

Second Embodiment

Figure 6:
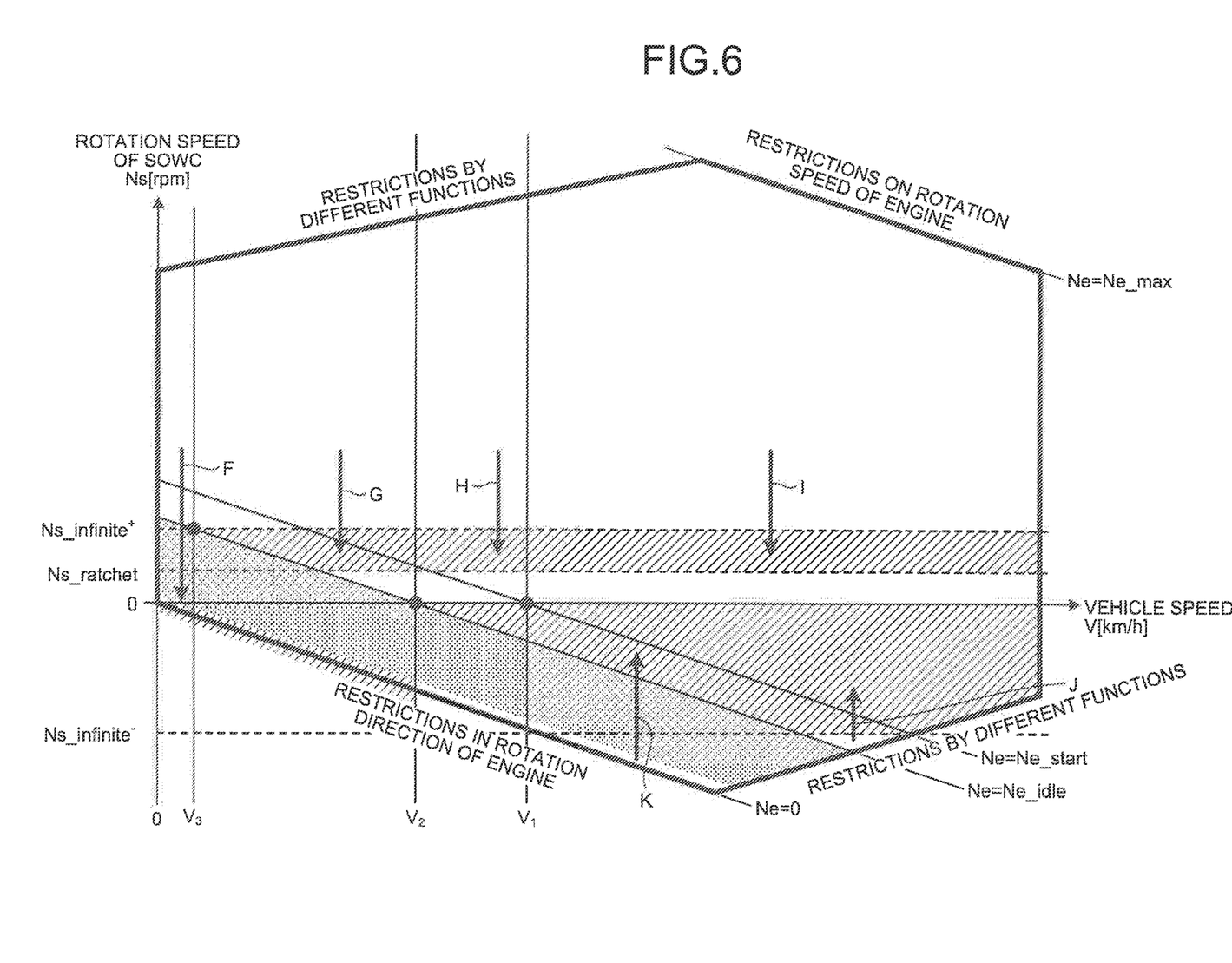
FIG. 6 is a graph illustrating a relationship between the vehicle speed and the rotation speed of the SOWC in a second embodiment.

FIG. 6 is a graph illustrating a relationship between a vehicle speed V and a rotation speed Ns of the SOWC 4 in a second embodiment. In FIG. 6, Ns_infinite⁺ represents a maximum rotation speed of the SOWC 4 that ensures the infinite service lifetime or the semi-infinite service lifetime even when the SOWC 4 is kept in the state of ratchet. In FIG. 6, $V_3$ represents a vehicle speed when the rotation speed Ns of the SOWC 4 is equal to Ns_infinite⁺ and a rotation speed Ne of the engine 1 is equal to an idling engine speed Ne_idle.

Figure 7:
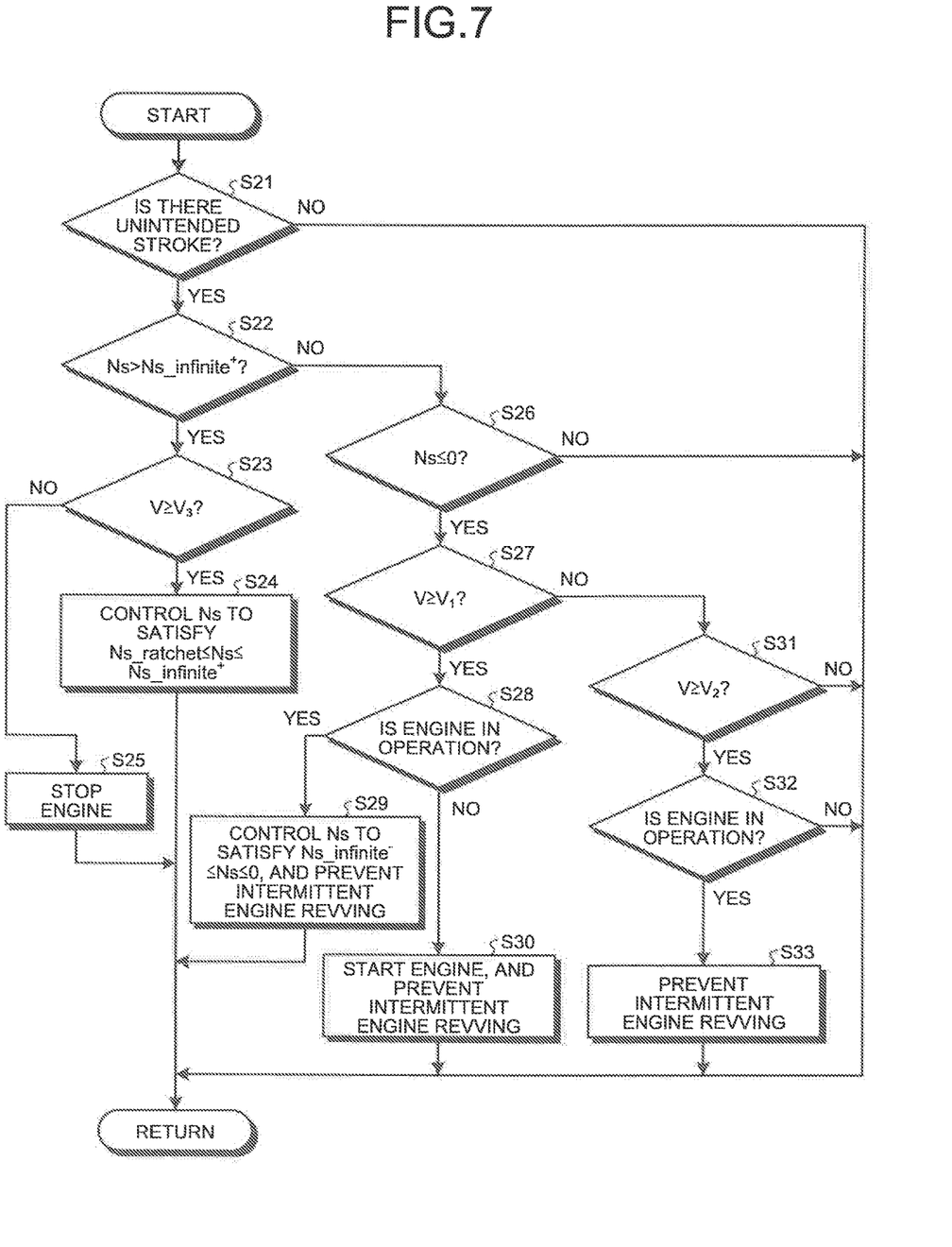
FIG. 7 is a flowchart illustrating failure control in the second embodiment which is performed based on the relationship between the vehicle speed and the rotation speed of the SOWC illustrated in FIG. 6.

FIG. 7 is a flowchart illustrating failure control in the second embodiment which is performed based on the relationship between the vehicle speed V and the rotation speed Ns of the SOWC 4 illustrated in FIG. 6. A routine of the failure control illustrated in FIG. 7 is repeatedly performed at every predetermined short time while a vehicle is running.

First, the electronic control device 18 determines whether the sensor 49 detects an unintended stroke of the actuator 48 due to an unintended motion of the selector plate 46 while the vehicle is running with the SOWC 4 in the state of disengagement (step S21). Determining that an unintended stroke is not detected (No in step S21), the electronic control device 18 returns to the starting point without performing specific control so as to keep the SOWC 4 in the state of disengagement. On the other hand, determining that an unintended stroke is detected (Yes in step S21), the electronic control device 18 determines whether the rotation speed Ns of the SOWC 4 satisfies an inequality Ns>Ns_infinite⁺ (step S22).

Determining that the inequality Ns>Ns_infinite⁺ is satisfied (Yes in step S22), the SOWC 4 is in the state of ratchet at high speed by differential rotation in the positive direction, and the electronic control device 18 determines whether the vehicle speed V satisfies an inequality V≥$V_3$ (step S23). Determining that the inequality V≥$V_3$ is not satisfied (No in step S23), the electronic control device 18 stops the engine 1 (step S25), sets the rotation speed Ne of the engine 1 at 0 rpm (the arrow F in FIG. 6), causes the SOWC 4 to fall into the state of overrun at low speed by differential rotation in the negative direction, and returns to the previous process. On the other hand, determining in step S23 that the inequality V≥$V_3$ is satisfied (Yes in step S23), the electronic control device 18 controls the rotation speed Ns of the SOWC 4 to satisfy an inequality Ns_ratchet≤Ns≤Ns_infinite⁺ (step S24, the arrows G, H, and I in FIG. 6), keeps the SOWC 4 in the state of ratchet that ensures the infinite service lifetime or the semi-infinite service lifetime by differential rotation in the positive direction, and then, returns to the previous process.

Determining in step S22 that the inequality Ns>Ns_infinite⁺ is not satisfied (No in step S22), the electronic control device 18 determines whether the rotation speed Ns of the SOWC 4 satisfies an inequality Ns≤0 (step S26). Determining that the equality Ns≤0 is not satisfied (No in step S26), the electronic control device 18 returns to the previous process without performing specific control. On the other hand, determining that the inequality Ns≤0 is satisfied (Yes in step S26), the electronic control device 18 determines whether the vehicle speed V satisfies an inequality V≥$V_1$ (step S27).

Determining that the inequality V≥$V_1$ is satisfied (Yes in step S27), the electronic control device 18 determines whether the engine 1 is in operation (step S28). Determining that the engine 1 is in operation (Yes in step S28), the electronic control device 18 controls the rotation speed Ns of the SOWC 4 to satisfy an inequality Ns_infinite⁻ Ns≤0 (the arrow J in FIG. 6), causes the SOWC 4 to fall into the state of overrun at low speed by differential rotation in the negative direction, prevents intermittent engine revving (step S29), and returns to the previous process. On the other hand, in step S28, determining that the engine 1 is not in operation (No in step S28), the electronic control device 18 starts the engine 1 (the arrow K in FIG. 6), causes the SOWC 4 to fall into the state of overrun at low speed by differential rotation in the negative direction, prevents intermittent engine revving (step S30), and returns to the previous process.

Determining in step S27 that the inequality $V \geq V_1$ is not satisfied (No in step S27), the electronic control device 18 determines whether the vehicle speed V of the SOWC 4 satisfies an inequality $V \geq V_2$ (step S31). Determining that the inequality $V \geq V_2$ is not satisfied (No in step S31), the rotation speed Ne of the engine 1 is 0 rpm, and the SOWC 4 is in the state of overrun at low speed by differential rotation in the negative direction. Therefore, the electronic control device 18 returns to the previous process without performing specific control. On the other hand, in step S31, determining that the inequality $V \geq V_2$ is satisfied (Yes in step S31), the electronic control device 18 determines whether the engine 1 is in operation (step S32). Determining that the engine 1 is not in operation (No in step S32), the electronic control device 18 returns to the previous process without performing specific control. At this time, the vehicle runs in the derate mode with the drive force from the second motor generator 3. On the other hand, in step S32, determining that the engine 1 is in operation (Yes in step S32), the SOWC 4 is in the state of overrun at low speed by differential rotation in the negative direction. Therefore, the electronic control device 18 prevents intermittent engine revving (step S33) and returns to the previous process.

In the second embodiment, as illustrated in FIG. 6, when there exists a range in the rotation speed Ns of SOWC 4 that satisfies $Ns\_ratchet \leq Ns \leq Ns\_infinite^+$, the rotation speed Ns is controlled to satisfy $Ns\_ratchet \leq Ns \leq Ns\_infinite^+$, in a state where $Ns > Ns\_infinite^+$ and $V \geq V_3$. Accordingly, while preventing abnormalities in the struts at the time of failure, the SOWC 4 has a wider range which does not cause the engine to stop. Therefore, the drive force from the engine 1 causes the first motor generator 2 to generate power and increases opportunity to charge the battery. This makes it easier to maintain a sufficient level of the remaining amount of charge in the battery when the vehicle runs in the derate mode and makes it possible to extend a distance at which the vehicle runs in the derate mode with the drive force from the second motor generator 3.

Third Embodiment

Figure 8:
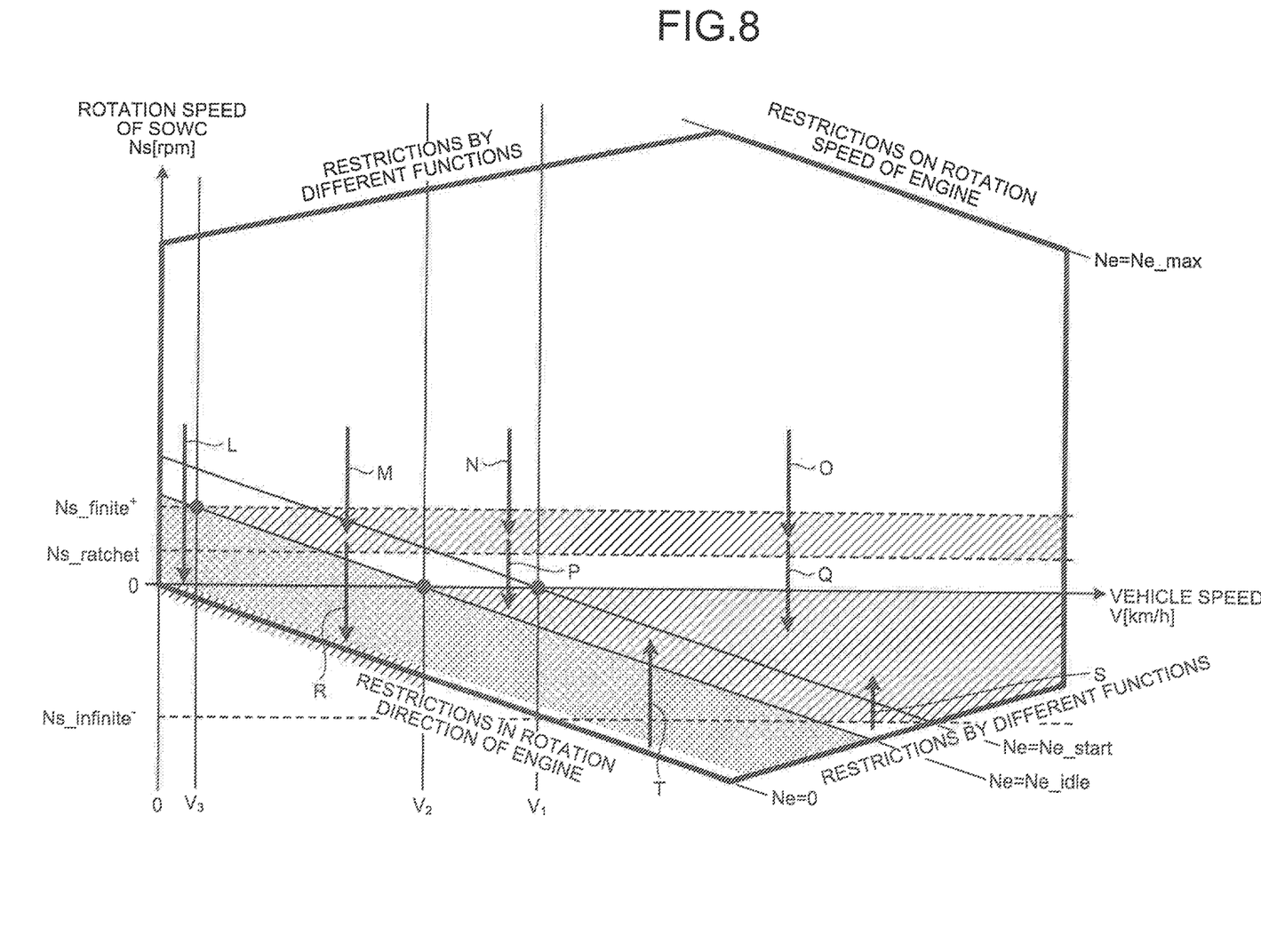
FIG. 8 is a graph illustrating a relationship between the vehicle speed and the rotation speed of the SOWC in a third embodiment.
Figure 9:
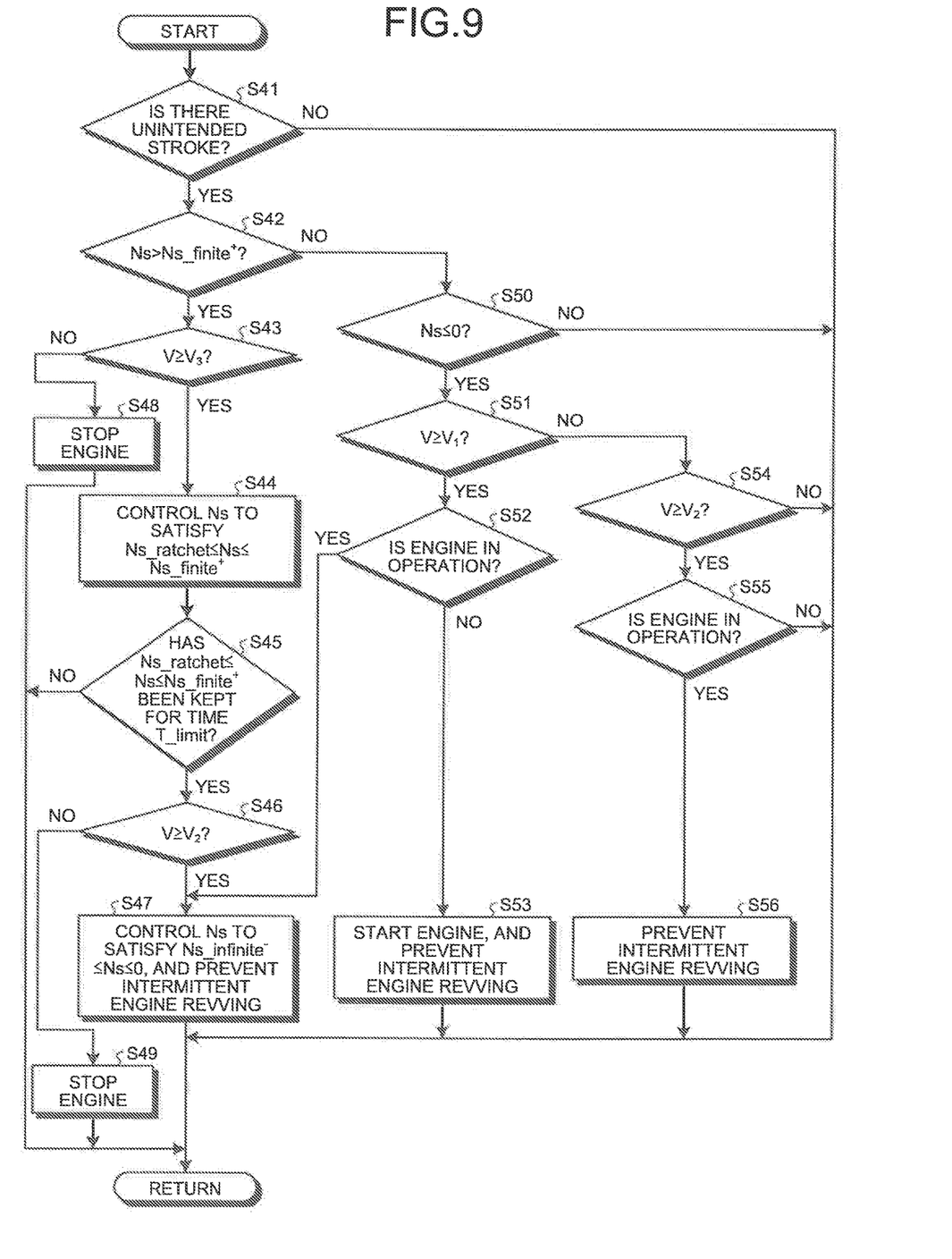
FIG. 9 is a flowchart illustrating failure control in the third embodiment which is performed based on the relationship between the vehicle speed and the rotation speed of the SOWC illustrated in FIG. 8.

FIG. 8 is a graph illustrating a relationship between a vehicle speed V and a rotation speed Ns of the SOWC 4 in a third embodiment. In FIG. 8, $Ns\_finite^+$ represents a maximum rotation speed of the SOWC 4 that ensures a finite service lifetime for a certain time or more, or a finite period during which the struts 42 do not break down, even when the SOWC 4 is kept in the state of ratchet. FIG. 9 is a flowchart illustrating failure control in the third embodiment which is performed based on the relationship between the vehicle speed V and the rotation speed Ns of the SOWC 4 illustrated in FIG. 8. A routine of the failure control illustrated in FIG. 9 is repeatedly performed at every predetermined short time while a vehicle is running.

First, the electronic control device 18 determines whether the sensor 49 detects an unintended stroke of the actuator 46 due to an unintended motion of the selector plate 46 while the vehicle is running with the SOWC 4 in the state of disengagement (step S41). Determining that an unintended stroke is not detected (No in step S41), the electronic control device 18 returns to the starting point without performing specific control so as to keep the SOWC 4 in the state of disengagement. On the other hand, determining that an unintended stroke is detected (Yes in step S41), the electronic control device 18 determines whether the rotation speed Ns of the SOWC 4 satisfies an inequality $Ns > Ns\_finite^+$ (step S42).

Determining that the inequality $Ns > Ns\_finite^+$ is satisfied (Yes in step S42), the SOWC 4 is in the state of ratchet at high speed by differential rotation in the positive direction, and the electronic control device 18 determines whether the vehicle speed V satisfies an inequality $V \geq V_3$ (step S43). Determining that the inequality $V \geq V_3$ is not satisfied (No in step S43), the electronic control device 18 stops the engine 1 (step S48), sets the rotation speed Ne of the engine 1 at 0 rpm (the arrow L in FIG. 8), causes the SOWC 4 to fall into the state of overrun at low speed by differential rotation in the negative direction, and returns to the previous process. At this time, the vehicle runs in the derate mode with the drive force from the second motor generator 3. On the other hand, determining in step S43 that the inequality $V \geq V_3$ is satisfied (Yes in step S43), the electronic control device 18 controls the rotation speed Ns of the SOWC 4 to satisfy an inequality $Ns\_ratchet \leq Ns \leq Ns\_finite^+$ (step S44, the arrows M, N, and O in FIG. 8), keeps the SOWC 4 in the state of ratchet that ensures the finite service lifetime for a certain time or more by differential rotation in the positive direction, and then, returns to the previous process.

The electronic control device 18, then, determines whether the inequality $Ns\_ratchet \leq Ns \leq Ns\_finite^+$ has been kept for a time T_limit (step S45). The time T_limit, for example, is shorter than the finite service lifetime of the SOWC 4 when the SOWC 4 is kept in the state of ratchet by differential rotation in the positive direction. The time T_limit may have a length of time during which a predetermined remaining amount of charge in the battery can be maintained for running in the derate mode.

Determining that the inequality is not kept for the time T_limit (No in step S45), the electronic control device 18 stores the time counted when the inequality $Ns\_ratchet \leq Ns \geq Ns\_finite^+$ is kept for the time T_limit, and returns to the previous process. In the subsequent routine, when the electronic control device 18 controls so as to satisfy the inequality $Ns\_ratchet \leq Ns \geq Ns\_finite^+$, the electronic control device 18 counts the time for which the inequality $Ns\_ratchet \leq Ns \geq Ns\_finite^+$ has been kept and adds the time to the time stored in advance. In this manner, the electronic control device 18 cumulates and counts the time for which the inequality $Ns\_ratchet\ Ns\ Ns\_finite^+$ has been kept, and when the cumulative counted time reaches the time T_limit, the electronic control device 18 determines in step S45 that the inequality has been kept for the time T_limit. The cumulative time herein is obtained by intermittently cumulating, every time the routine of each cycle is ended, the time for which the inequality $Ns\_ratchet \leq Ns \geq Ns\_finite^+$ has been kept.

In step S45, determining that the inequality is kept for the time T_limit (Yes in step S45), the electronic control device 18 determines whether the vehicle speed V satisfies an inequality $V \geq V_2$ (step S46). Determining that the inequality $V \geq V_2$ is satisfied (Yes in step S46), the electronic control device 18 controls the rotation speed Ns of the SOWC 4 to satisfy an inequality $Ns\_infinite^- \leq Ns \leq 0$ (the arrows P and Q in FIG. 8), causes the SOWC 4 to fall into the state of overrun at low speed by differential rotation in the negative direction, prevents intermittent engine revving (step S47), and returns to the previous process. On the other hand, in step S46, determining that the inequality V≥V$_2$ is not satisfied (No in step S46), the electronic control device 18 stops the engine 1 (step S49), sets the rotation speed Ne of the engine 1 at 0 rpm (the arrow R in FIG. 8), causes the SOWC 4 to fall into the state of overrun at low speed by differential rotation in the negative direction, and returns to the previous process. At this time, the vehicle runs in the derate mode with the drive force from the second motor generator 3.

Determining in step S42 that the inequality Ns>Ns_finite$^+$ is not satisfied (No in step S42), the electronic control device 18 determines whether the rotation speed Ns of the SOWC 4 satisfies an inequality Ns≤0 (step S50). When the inequality Ns 0 is not satisfied (No in step S50), the electronic control device 18 returns to the previous process without performing specific control. On the other hand, in step S50, determining that the inequality Ns≤0 is satisfied (Yes in step S50), the electronic control device 18 determines whether the vehicle speed V satisfies an inequality V≥V$_1$ (step S51).

Determining that the inequality V≥V$_1$ is satisfied (Yes in step S51), the electronic control device 18 determines whether the engine 1 is in operation (step S52). Determining that the engine 1 is in operation (Yes in step S52), the electronic control device 18 controls the rotation speed Ns of the SOWC 4 to satisfy the inequality Ns_infinite$^-$≤Ns≤0 (the arrow S in FIG. 8), causes the SOWC 4 to fall into the state of overrun at low speed by differential rotation in the negative direction, prevents intermittent engine revving (step S47), and returns to the previous process. On the other hand, in step S52, determining that the engine 1 is not in operation (No in step S52), the electronic control device 18 starts the engine 1 (the arrow T in FIG. 8), causes the SOWC 4 to fall into the state of overrun at low speed by differential rotation in the negative direction, prevents intermittent engine revving (step S53), and returns to the previous process.

Determining in step S51 that the inequality V≥V$_1$ is not satisfied (No in step S51), the electronic control device 18 determines whether the vehicle speed V of the SOWC 4 satisfies an inequality V≥V$_2$ (step S54). Determining that the inequality V≥V$_2$ is not satisfied (No in step S54), the rotation speed Ne of the engine 1 is 0 rpm, and the SOWC 4 is in the state of overrun at low speed by differential rotation in the negative direction. Therefore, the electronic control device 18 returns to the previous process without performing specific control. At this time, the vehicle runs in the derate mode with the drive force from the second motor generator 3. On the other hand, in step S54, determining that the inequality V≥V$_2$ is satisfied (Yes in step S54), the electronic control device 18 determines whether the engine 1 is in operation (step S55). Determining that the engine 1 is not in operation (No in step S55), the electronic control device 18 returns to the previous process without performing specific control. At this time, the vehicle runs in the derate mode with the drive force from the second motor generator 3. On the other hand, in step S55, determining that the engine 1 is in operation (Yes in step S55), the SOWC 4 is in the state of overrun at low speed by differential rotation in the negative direction. Therefore, the electronic control device 18 prevents intermittent engine revving (step S56) and returns to the previous process.

In the third embodiment, as illustrated in FIG. 8, when there exists a range in the rotation speed Ns of SOWC 4 that satisfies Ns_ratchet≤Ns≤Ns_finite$^+$, the rotation speed Ns is controlled to satisfy Ns_ratchet≤Ns≤Ns_finite$^+$, in a state where Ns>Ns_finite$^+$ and V≥V$_3$. Accordingly, even when the state of ratchet is finite servicekifetime, the SOWC 4 prevents abnormalities in the struts at the time of failure and has a wider range which does not cause the engine 1 to stop. Therefore, the drive force from the engine 1 causes the first motor generator 2 to generate power and increases opportunity to charge the battery. This makes it easier to maintain a sufficient level of the remaining amount of charge in the battery when the vehicle runs in the derate mode and makes it possible to extend a distance at which the vehicle runs in the derate mode with the drive force from the second motor generator 3.

In order to allow a vehicle to run in the derate mode while a selectable one-way clutch is made to rotate differentially at a rotation speed equal to or less than a predetermined absolute value at the time of failure, a control device for a selectable one-way clutch according to the present disclosure prevents an occurrence of failure and prevents an engagement member from being continuously subject to a large impact. Therefore, the control device for a selectable one-way clutch according to the present disclosure has an effect of preventing an occurrence of abnormalities in the engagement member at the time of failure.

According to an embodiment, it is possible to avoid continuation of the state of ratchet at a high speed and the state of overrun at a high speed in the selectable one-way clutch at the time of failure, which prevents the engagement members from being continuously subject to the large impact.

According to an embodiment, it is easier to prevent abnormalities in the engagement members at the time of failure and to maintain a sufficient level of a remaining amount of charge while a vehicle is running in the derate mode, leading to extension of a distance which the vehicle runs in the derate mode.

According to an embodiment, even when the state of ratchet is finite, it is easier to prevent abnormalities in the engagement members at the time of failure and to maintain the sufficient level of the remaining amount of charge while the vehicle is running in the derate mode, whereby extending the distance which the vehicle runs in the derate mode.

According to an embodiment, the engagement members in the state of ratchet is prevented from reaching the end of their lives.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device for a selectable one-way clutch, the selectable one-way clutch comprising:
   a pocket plate including a plurality of housing recesses on one surface thereof;
   engagement members housed in the respective housing recesses;
   elastic members disposed between bottoms of the respective housing recesses and the engagement members and configured to bias the engagement members;
   a notch plate configured to rotate relative to the pocket plate and including a plurality of engagement recesses on a surface that faces the one surface of the pocket plate; and
   a selector plate disposed between the pocket plate and the notch plate, having a plurality of openings that penetrates the selector plate in a thickness direction, and configured to rotate coaxially with a rotation axis of the notch plate to change over between a first state and a second state, the first state allowing the engagement members to pass through the respective openings and to stand up from a side close to the pocket plate toward a side close to the notch plate, the second state allowing the housing recesses to house the respective engagement members, wherein the control device for the selectable one-way clutch comprises a motion detection unit configured to detect a motion of the selector plate, and when the motion detection unit detects an unintended motion of the selector plate, the control device causes the pocket plate and the notch plate to rotate differentially at a rotation speed equal to or less than a predetermined absolute value, and the control device controls the selectable one-way clutch to fall into a state of ratchet where the engagement members and the engagement recesses do not engage with each other by differential rotation of the pocket plate and the notch plate in a positive direction, or into a state of overrun where the engagement members and the engagement recesses do not engage with each other by differential rotation of the pocket plate and the notch plate in a negative direction.

2. The control device for a selectable one-way clutch control device according to claim 1, wherein, when the motion detection unit detects an unintended motion of the selector plate, the control device controls a rotation speed of the selectable one-way clutch to be equal to or more than a minimum rotation speed that ensures an infinite service lifetime or a semi-infinite service lifetime even with the selectable one-way clutch being kept in the state of overrun, the rotation speed being equal to or less than zero.

3. The control device for a selectable one-way clutch control device according to claim 1, wherein, in a state where a vehicle speed is equal to or more than a speed at a time when a rotation speed of the selectable one-way clutch is more than a maximum rotation speed that ensures an infinite service lifetime or a semi-infinite service lifetime even with the selectable one-way clutch being kept in the state of ratchet and a time when the rotation speed of the selectable one-way clutch is equal to the maximum rotation speed and a rotation speed of an engine is equal to an idling engine speed, the control device controls the rotation speed of the selectable one-way clutch to be equal to or more than a minimum rotation speed that avoids engagement between the engagement members and the engagement recesses even with the selectable one-way clutch being kept in the state of ratchet, the rotation speed being equal to or less than the maximum rotation speed.

4. The control device for a selectable one-way clutch control device according to claim 1, wherein, in a state where a vehicle speed is equal to or more than a speed at a time when a rotation speed of the selectable one-way clutch is more than a maximum rotation speed that ensures a finite service lifetime for a certain time or more even with the selectable one-way clutch being kept in the state of ratchet and a time when the rotation speed of the selectable one-way clutch is equal to the maximum rotation speed and a rotation speed of an engine is equal to an idling engine speed, the control device controls the rotation speed of the selectable one-way clutch to be equal to or more than a minimum rotation speed that avoids engagement between the engagement members and the engagement recesses even with the selectable one-way clutch being kept in the state of ratchet, the rotation speed being equal to or less than the maximum rotation speed.

5. The control device for a selectable one-way clutch control device according to claim 4, wherein, when a cumulative time reaches a predetermined time, the control device controls the rotation speed of the selectable one-way clutch to be equal to or more than the minimum rotation speed that ensures an infinite service lifetime or a semi-infinite service lifetime even with the selectable one-way clutch being kept in the state of overrun, the rotation speed being equal to or less than zero, and in the cumulative time, the rotation speed of the selectable one-way clutch is kept equal to or more than the minimum rotation speed that avoids engagement between the engagement members and the engagement recesses even with the selectable one-way clutch being kept in the state of ratchet, the rotation speed being equal to or less than the maximum rotation speed.

* * * * *